United States Patent
Howe

(12) 
(10) Patent No.: US 6,170,529 B1
(45) Date of Patent: Jan. 9, 2001

(54) KNOCK-OFF PLUG FOR PLASTIC PIPE

(75) Inventor: Sam H. Howe, Carson City, NV (US)

(73) Assignee: LSP Products Group, Inc., Carson City, NV (US)

( * ) Notice: Under 35 U.S.C. 154(b), the term of this patent shall be extended for 0 days.

(21) Appl. No.: 09/366,843

(22) Filed: Aug. 4, 1999

(51) Int. Cl.$^7$ ................................................ F16L 55/10
(52) U.S. Cl. ........................ 138/89; 138/89.4; 138/104; 215/230; 215/256; 215/258; 220/268; 220/276
(58) Field of Search .................... 138/89, 89.1, 89.3, 138/89.4, 90, 104; 215/230, 256, 258; 220/268, 276

(56) References Cited

U.S. PATENT DOCUMENTS

| | | | |
|---|---|---|---|
| 743,269 | * 11/1903 | Godin | 138/89 |
| 3,633,586 | * 1/1972 | Sheridan | 138/89 |
| 3,646,980 | * 3/1972 | Peterson | 138/89 |
| 3,996,966 | * 12/1976 | Princell | 138/89 |
| 4,678,097 | * 7/1987 | Crute | 138/89 |
| 4,899,903 | * 2/1990 | Miyasaka et al. | 138/89 |
| 4,936,350 | * 6/1990 | Huber | 138/90 |
| 5,033,510 | * 7/1991 | Huber | 138/90 |
| 5,706,860 | * 1/1998 | Gonyea | 138/89 |
| 6,032,515 | * 3/2000 | Huber | 138/90 |

OTHER PUBLICATIONS

Specialty Products Catalog, p. 3, published at least as early as Oct. 15, 1998.

* cited by examiner

*Primary Examiner*—James Hook
(74) *Attorney, Agent, or Firm*—Locke Liddell & Sapp LLP; Monty L. Ross

(57) ABSTRACT

A plastic end plug for use with plastic pipe, the end plug having a knock-off disc with dimensions that prevent the entire disc, when separated from the remainder of the plug, from entering the pipe bore. The knock-off disc of the plastic end plug is removable by a force applied to the disc in a direction substantially perpendicular to the longitudinal axis through the pipe bore, and desirably includes an optical indicator observable by the user to determine whether or not the underside of the knock-off disc is wetted by a fluid contained in the pipe segment.

9 Claims, 1 Drawing Sheet

KNOCK-OFF PLUG FOR PLASTIC PIPE

BACKGROUND OF THE INVENTION

1. Field of the Invention

This invention relates to end plugs for pipes and, more particularly, to polymeric plugs of the type that are cemented into the ends of plastic pipe for use in leak testing.

2. Description of Related Art

Pipe end plugs are frequently used for leak testing of plastic pipe installations and to keep debris out of plastic pipes during construction. The plugs are typically injection molded from a thermoplastic material such as polystyrene and have annular flanges that are cemented in place on the end of a section of plastic pipe. Once the pipe has been filled with a fluid and the flow system has been tested for leaks, a circular "knockout" disc in the plug is removed to permit the passage of fluid through the end of the pipe into other fittings or flow lines to which the pipe end is subsequently connected.

Conventional plastic pipe end plugs comprise a knockout disc that traverses the pipe bore at a point recessed slightly inside the end of the pipe. The knockout disc is typically molded as a unitary part of the plug and is connected to the inside annular flange of the plug by a continuous, circumferentially extending web having a reduced thickness as compared to the thickness of either the disc or flange portions of the plug. The thinned plastic web is designed to be strong enough to withstand the anticipated test pressure, but thin enough to facilitate removal from the plug flange by the application of force such as a hammer blow when it is time for the knockout plug to be removed.

One disadvantage commonly experienced in using conventional plastic pipe end plugs is that the knockout disc falls into the pipe when removed from the plug. Similarly, If the disc shatters instead of breaking away cleanly when struck with a tool such as a hammer, pliers or screwdriver, the blow can drive plastic fragments further into the bore. A pipe plug is therefore needed that comprises an easily removable disc which cannot fall into the pipe upon removal.

Another disadvantage commonly experienced in using conventional pipe end plugs is that the plug and disc are opaque. This opacity precludes the user from observing whether or not the test fluid, typically water, has sufficiently filled the piping system to reach and fully contact the plugged pipe end. In the past, users have often drilled through or otherwise punctured the end plug during a leak test in order to determine whether the underside was wetted. A pipe end plug is therefore needed that will permit the user to determine by visual inspection whether or not the underside of the knockout disc is wetted by a contained fluid.

SUMMARY OF THE INVENTION

Disclosed herein is a plastic end plug for use with plastic pipe, the end plug having a knock-off disc with dimensions that prevent the entire disc, when separated from the remainder of the plug, from entering the pipe bore. The knock-off disc of the plastic end plug is removable by a force applied to the disc in a direction substantially perpendicular to the longitudinal axis through the pipe bore, and desirably includes an optical indicator observable by the user to determine whether or not the underside of the knock-off disc is wetted by a fluid contained in the pipe segment.

According to one preferred embodiment of the invention, an end plug is provided for use with plastic pipe, the plug comprising a knock-off disc having a cross-sectional dimension that, when the disc is separated from the annular flange of the pipe, is too great to permit the disc to fall through the plug flange and into the pipe bore. The pipe end plug of the invention preferably includes a knock-off disc that extends slightly beyond the end of the plastic pipe section on which it is installed, has a diameter slightly greater than the inside diameter of the annular flange of the plug, and is removable from the annular flange of the plug by the application of a blow in a direction substantially perpendicular to the longitudinal axis through the pipe bore.

According to another embodiment of the invention, a pipe end plug is disclosed that comprises means for visually determining whether the underside of the plug is wetted by a contained fluid. One preferred pipe end plug comprises a clear plastic knock-off disc. Another preferred pipe end plug comprises a knock-off disc with an underside that appears "frosted" or has a visible symbol or legend when dry, but that appears transparent or without any visible symbol or legend when wetted by a fluid contained inside the pipe.

BRIEF DESCRIPTION OF THE DRAWINGS

The apparatus of the invention is further described and explained in relation to the following figures of the drawings wherein.

DESCRIPTION OF THE PREFERRED EMBODIMENTS

Figure 1:
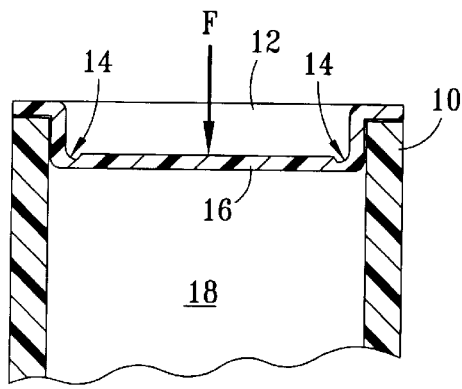
FIG. 1 is a simplified, cross-sectional, front elevation view of one end of a plastic pipe segment having a PRIOR ART plastic pipe end plug installed therein.

Referring to FIG. 1, a plastic pipe segment 10 is shown with an attached PRIOR ART plastic end plug 12 having a knockout disc 16 traversing bore 18. Knockout disc 16 is removable from end plug 12 by the application of force F in a direction substantially parallel to the longitudinal axis of bore 18, which force F severs or ruptures the thinner, circumferentially extending webs indicated by notches 14, allowing knockout disc 16 to fall downward into bore 18.

Figure 2:
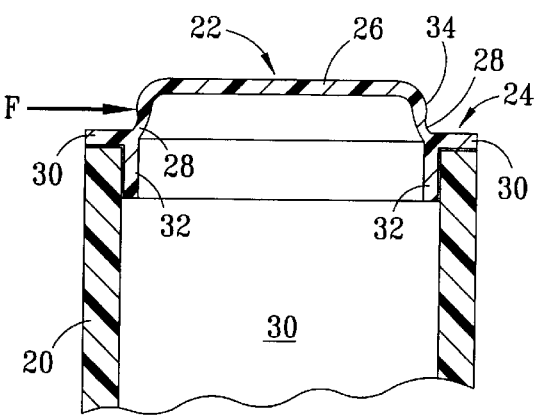
FIG. 2 is a simplified, cross-sectional, front elevation view of one end of a plastic pipe segment having a preferred pipe end plug of the invention installed therein.
Figure 3:
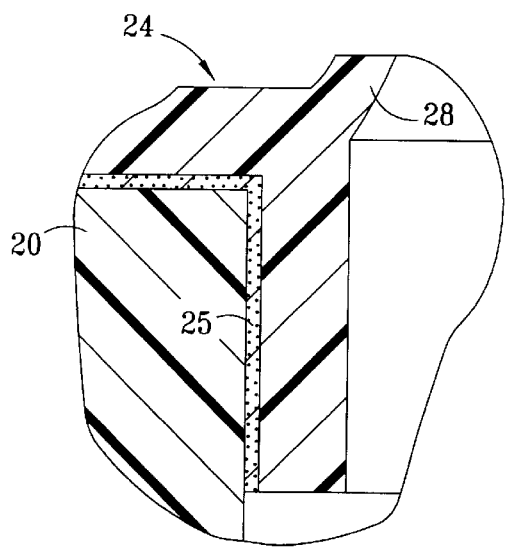
FIG. 3 is an enlarged detail view showing the adhesive layer preferably used to bond the pipe end plug of the invention to one end of a plastic pipe segment.

Referring to FIG. 2, a plastic pipe segment 20 is shown with an attached end plug 22 of the invention comprising an annular flange structure 24 attachable to the end of pipe segment 20. Annular flange structure 24 preferably comprises horizontal flange member 30 and vertical flange member 32, with horizontal flange member 30 having an outside diameter approximately contiguous with the outside diameter of pipe segment 20 and with vertical flange member 32 having an outside diameter slightly less than the inside diameter of pipe segment 20. Convex knock-off disc 26 is preferably dome shaped and connected to annular flange structure 24 by a circumferentially extending plastic web 28 having a thickness less than that of annular flange structure 24. Referring to FIG. 3, which is an enlarged cross-sectional detail view of the connection between annular flange structure 24 and pipe segment 20 as shown on the left side of FIG. 2, annular flange structure 24 is depicted as being attached to pipe segment 20 by cement layer 25. Knock-off disc 26 is preferably configured so that its maximum outside diameter 34 is greater than the inside diameter of vertical flange member 32. This being the case, when knock-off disc 26 is separated from annular flange structure 24 by the application of force F' in a direction substantially perpendicular to the longitudinal axis through bore 30 of pipe segment 20, circumferentially extending plastic web 28 will fracture but knock-off disc 26 will not fall into bore 30 of pipe segment 20 because outside diameter 34 is greater than the inside diameter of vertical flange member 32.

Figure 4:
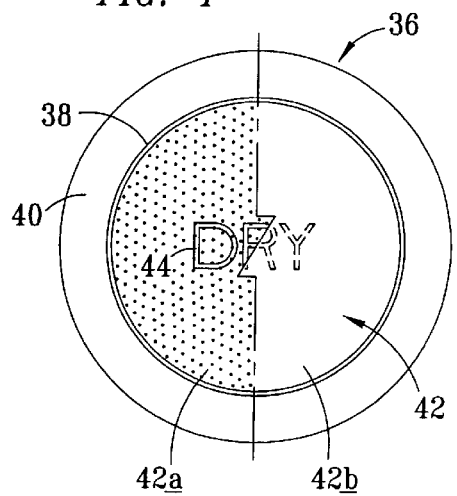
FIG. 4 is a simplified plan view of a pipe end plug of the invention as installed on a plastic pipe segment, with the left half depicting a frosted, unwetted underside, and the right half depicting a clear, wetted underside with a phantom outline of the letters no longer plainly visible to the user.

According to one particularly preferred embodiment of the invention as depicted in FIG. 4, a molded plastic end plug 36 is disclosed having knock-off disc 42 connected to annular flange structure 40 by a circumferentially extending plastic web 38 having a thickness less than that of the annular flange structure 40. According to this embodiment of the invention, knock-off disc 42 preferably comprises an optical indicator showing whether or not the underside is wetted by a fluid in the pipe segment to which end plug 36 is attached. As shown in FIG. 4, knock-off disc 42 is preferably made of a translucent, or most preferably transparent, polymeric material having an underside that is textured in such manner that the texturing is visible as depicted in half 42a when the underside is unwetted and that is not visible when the underside is wetted as depicted on half 42b. If desired, lettering such as the word "DRY" 44 can be manufactured into the underside of knock-off disc 42 in such manner that the lettering will appear visible when not wetted by liquid and that will not be clearly visible when wetted by liquid. Alternatively, it will be appreciated that an indicator can be provided on the underside of knock-off disc 42 that would be invisible when not wetted and visible when wetted.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A molded plastic end plug attachable to an end of a pipe segment having inside and outside diameters and a longitudinal bore, the end plug comprising an annular flange structure attachable to the pipe end and a knock-off disc traversing the bore;

the annular flange structure further comprising a radially extending flange member adjacent to the pipe end, said radially extending flange member having an outside diameter contiguous with the outside diameter of the pipe segment, and an axially extending flange member having an outside diameter slightly less than the inside diameter of the pipe segment, and insertable inside the pipe end;

the knock-off disc being connected to the annular flange structure by a circumferentially extending plastic web;

the knock-off disc being removable from the annular flange structure by the application of force to the disc in a direction substantially perpendicular to the longitudinal bore, and the knock-off disc having a cross-sectional dimension great enough to prevent the entire disc, when removed from the annular flange structure, from entering the bore.

2. The end plug of claim 1 wherein the knock-off disc is dome-shaped and connected to the annular flange structure by a circumferentially extending plastic web having a thickness less than that of the annular flange structure.

3. The end plug of claim 1 wherein the annular flange structure is cementable to the pipe end.

4. The end plug of claim 1 wherein the knock-off disc has an underside facing the bore and an optical indicator showing whether or not the underside is wetted by a fluid in the pipe segment.

5. The end plug of claim 4 wherein the underside is textured so as to appear frosted.

6. The end plug of claim 4 wherein the underside bears a legend that is visible only when the underside is not wetted.

7. The end plug of claim 4 wherein the underside bears a symbol that is visible only when the underside is not wetted.

8. The end plug of claim 4 wherein the knock-off disc is translucent.

9. The end plug of claim 4 wherein the knock-off disc is transparent.

* * * * *